April 29, 1958     K. S. CLAPP     2,832,169
FISHING LURE
Filed Nov. 5, 1954
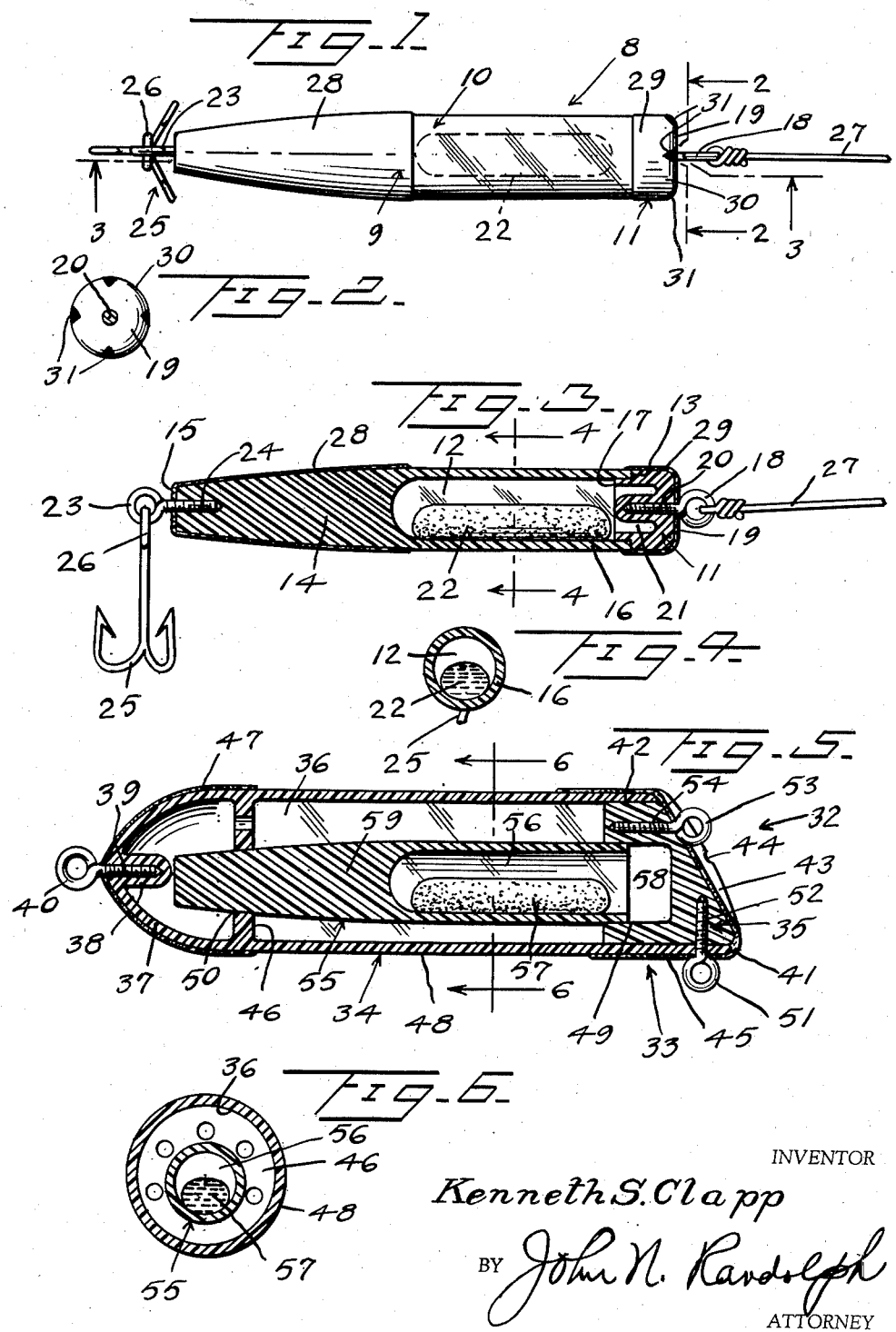
INVENTOR
Kenneth S. Clapp
BY John N. Randolph
ATTORNEY

United States Patent Office 2,832,169
Patented Apr. 29, 1958

2,832,169

FISHING LURE

Kenneth S. Clapp, Angola, Ind.

Application November 5, 1954, Serial No. 466,990

3 Claims. (Cl. 43—42.31)

This invention relates to a novel fishing lure or artificial fishing bait having the characteristics of a live natural bait and which very realistically simulates the appearance and action of natural baits.

More particularly, it is an aim of the present invention to provide an artificial bait which when being retrieved or slowly trolled will wiggle, dive, dart and jump similar to a live bait, without requiring manipulation of the rod or pole, but merely by changing the speed at which the bait is retrieved or trolled, so that no special skill is required by the user.

Still a further object of the invention is to provide a an artificial bait possessing the aforedescribed actions when in use, yet which does not include attachments such as spoons, plates or spinners to activate the lure.

Still a further object of the invention is to provide a novel lure capable of being constructed in various sizes and which may be readily produced in a small size and yet possess sufficient weight to enable the lure to be readily cast a considerable distance, and wherein the weight of the lure cooperates with the shape thereof to enable the lure to be cast effectively into a strong wind without materially sacrificing the distance of the cast.

Still a further object of the invention is to provide bait which can be retrieved or trolled easily while executing its variety of movements in the water and which will not readily become snagged by weeds, underwater logs or other obstructions, due to the fact that the bait body has no external projections.

Various other objects and advantages of the invention will hereinafter become more fully apparent from the following description of the drawing, illustrating presently preferred embodiments thereof, and wherein:

Figure 1 is a top plan view of one form of the lure or artificial bait;

Figure 2 is a transverse sectional view thereof, taken substantially along a plane as indicated by the line 2—2 of Figure 1 and showing the forward end of the lure body in elevation, the hook and eyes being omitted;

Figure 3 is a longitudinal sectional view of the lure, taken substantially along a plane as indicated by the line 3—3 of Figure 1;

Figure 4 is a cross sectional view of the lure body, taken substantially along a plane as indicated by the line 4—4 of Figure 3;

Figure 5 is a longitudinal substantially central sectional view of another form of the lure, and Figure 6 is a cross sectional view thereof, taken substantially along a plane as indicated by the line 6—6 of Figure 5.

Referring more specifically to the drawing, and first with reference to Figures 1 to 4, the fishing lure or artificial bait in its entirety is designated generally 8 and includes an elongated lure body 9. The lure body 9 is of a relatively small size in cross section as compared to its length and is preferably although not necessarily circular in cross section. The lure body 9 is preferably formed of a molded transparent material such as plastic and preferably includes a main body section 10 and a forward section or head portion 11. The forward section or head portion 11 is preferably of a relatively short length as compared to the main body portion 10.

The forward part of the main body portion 10 is recessed to define an elongated hollow chamber 12 which is located rearwardly of the forward end 13 of said section 10 and which is of a length approximately equal to one-half the over-all length of the section 10. The rear or tail portion 14 of the main body section 10 is preferably solid and tapered toward its rear or tail end 15. The chamber 12 is sufficiently large in cross section as compared to the section of the forward part of the main body portion 10 in which said chamber is formed, so that the body portion 10 has a relatively thin wall portion 16 surrounding the chamber or recess 12.

The head portion 11 is externally recessed as shown in Figure 3, at 17, to fit snugly into the open forward end 13 of the recess 12. The head section 11 can be secured to said forward end 13 in any suitable manner as by a fusion of the parts at the joint so that the head 11 will effectively seal the chamber 12. The head 11, forwardly of the joint provides a smooth continuation of the exterior of the chamber wall 16. A line engaging eye 18 projects forwardly from the forward face 19 of the head 11 and has a shank portion 20 embedded in the head 11, substantially centrally thereof and axially of the lure body 9. The rear portion of the head 11 may be provided with an annular recess 21 surrounding the part thereof in which the shank 20 is embedded.

Before the head 11 is secured to the forward end 13, a readily shiftable weight 22 is inserted in the recess or chamber 12 through its open end 13. Said shiftable or readily movable weight 22 preferably comprises mercury but may be constituted by any other heavy material capable of moving readily lengthwise of the chamber 12.

A hook engaging eye 23 is disposed beyond the tail end 15 of the lure body and has a shank 24 anchored in the lure body portion 14 and disposed longitudinally thereof. A conventional fishhook 25 is connected in a conventional manner to the eye 23 for swinging movement relative thereto by engagement of an eye 26 formed at the shank end of the fishhook 25 with the eye 23. The fishhook 25 is shown as being of the multibarbed type but a conventional single barbed fishhook could be substituted for the fishhook 25. One end of a fishing leader or line 27 is secured in a conventional manner to the forward eye 18.

If desired, the tail portion 14 and head portion 11 may be provided with opaque coatings 28 and 29 of any suitable color, so that only the wall portion 16 surrounding the chamber 12 will be left transparent. However, if desired the coatings 28 and 29 can be omitted. As seen in Figures 1 and 2, a periphery 30 of the front face 19 is round and is provided with a plurality, preferably four markings 31 which are equally spaced apart and which are of a color distinct from the color of the coating 29 to simulate eyes, at least two of which will be visible in any rotated position of the lure body about its longitudinal axis when the lure is viewed from above, below or either side thereof.

The shiftable weight 22 is sufficiently heavy to render the lure 8 in its entirety non-buoyant, so that the lure will normally sink in the water. As illustrated in Figures 1 and 3, the chamber 12 extends close to the forward end of the lure body 9 and has its rear end disposed nearly intermediate of the ends of said lure body so that the major portion of the shiftable weight 22 is normally disposed forwardly of the intermediate portion or center of the lure body. The shiftable weight 22 fills a sufficient part of the chamber 12 so that it renders the forward end of the lure 8 heavier than the rear end thereof. Consequently, when the lure is at rest in the water the head thereof will tend to sink more rapidly than the tail portion 14, this being particularly true since the shiftable weight 22 will shift toward the head 11 as the head assumes a position below the level of the tail portion 14. If the shiftable weight 22 is mercury, the mercury will flow toward the head 11 and will assume a shape to substantially fill the forward end of the chamber 12 to thus increase the weight of the forward portion of the lure body 9 relative to its tail portion. Consequently, as the lure is retrieved or slowly trolled it will be pulled back toward a horizontal position by an upward and forward pull exerted on the head portion thereof by the line or leader 27 in a direction from left to right of Figures 1 and 3. By retrieving or trolling the lure at an irregular speed, as the pull on the line or leader 27 is diminished intermittently, the weighted forward end of the lure will again tend to descend more rapidly than the tail portion 14 and the shiftable weight 22 will move toward the head 11. Thus, the lure 8 will execute a vertical darting or wiggling movement in its travel through the water due to the ability of the shiftable weight to move in the chamber 12 as the lure is moved from left to right of Figures 1 and 3, to thus cause the lure to follow an irregular course very realistically simulating the course followed by a swimming natural bait fish especially when attempting to escape from a game fish.

Furthermore, movement of the mercury 22 in the chamber 12 and the changing of shape thereof resulting from such movement will cause the mercury to very realistically simulate a natural bait such as a worm and as the mercury 22 is visible through the transparent chamber wall 16, the lure 8 will thus be rendered even more attractive to a game fish substantially all species of which are attracted to and will bite on worms.

Obviously, the lure 8 may be made in various sizes and may be of various cross sectional shapes, so long as the chamber 12 is of substantially circular cross section.

Figures 5 and 6 illustrate another embodiment of the fishing lure or artificial bait, designated generally 32. The lure 32 includes a lure body, designated generally 33. The main body 33 includes a body portion 34 extending substantially from end-to-end of the lure 32 and a head portion 35. The body portion 34 is preferably formed of plastic and is substantially hollow from end-to-end thereof to provide a relatively large chamber 36. The body portion 34 has a tapered closed rear end or tail portion 37 which is preferably provided with a central internally disposed and longitudinally extending projection 38 in which is anchored the shank 39 of a hook receiving eye 40, which is disposed beyond the extremity of the tail portion 37. The main body portion 34 has an open forward end 41. The head portion 35 has a peripheral part 42 which seats in and seals the open forward end 41 and which may be secured in any suitable manner to the body section 34. The head 35, beyond and adjacent the open forward end 41 of the main body section, is provided with a front face 43 which is inclined downwardly and forwardly from top to bottom of the head and which is preferably dished or bowed concavely from side to side thereof. The face 43 may be provided with suitable markings 44, one of which is shown in Figure 5, to simulate eyes and may be otherwise suitably marked. The exterior of the forward part of the lure 32 may be provided with a coating of any desired color, designated 45.

The hollow interior chamber 36, which is sealed by the head 35 is preferably provided with an apertured partition wall 46 near the tail portion 37. Said tail portion 37 may be provided with a coating 47, of the same or a different color than the coating 45, which preferably covers the rear end of the body 33 to or slightly beyond the partition 46. The coatings 45 and 47 are preferably opaque. The wall portion 48 of the body section 34, disposed between said coatings 45 and 47 is preferably clear or transparent. The head portion 35 is likewise preferably formed of plastic and is provided with an inwardly or rearwardly opening recess 49 in the lower part thereof. The bottom part of the partition 46 is provided with an opening 50 which is disposed substantially in alignment with the recess 49. A screw eye 51 is disposed beneath the forward body part 41 and has a shank 52 anchored therein and in the head 35. The screw eye 51 constitutes a second fishhook supporting eye. A leader engaging eye 53 projects outwardly from the upper part of the face portion 43 and has a shank 54 embedded in the head 35 above the recess 49.

A core 55 is disposed within the chamber 36 and longitudinally thereof and is preferably formed by a plastic body portion, corresponding to the body member 9 of the lure 8, the chamber 56 of which contains a shiftable weight 57, corresponding to the weight 22. The closed forward end 58 of the core 55, which corresponds to the head 11, is seated securely in the recess 49. The solid rear portion 59 of the core 55, which corresponds to the tail portion 14, extends through and is seated snugly in the opening 50 of the partition 46. The core 55 is thus supported out of contact with and spaced from the surrounding wall portion 48.

The core 55 is preferably transparent from end-to-end thereof and a substantial part thereof including the chamber 56 is surrounded by the transparent chamber wall 48, so that the mercury or shiftable weight 57 is visible through the wall 48 and the core wall surrounding the chamber 56. As seen in Figures 5 and 6, the longitudinal axis of the core 55 is disposed substantially below the axis of the main lure body 33, so that the shiftable weight 57 is likewise disposed below the axis of the main lure body 33. Thus, the shiftable weight 57 in acting against the buoyancy afforded by the chamber 36, the major part of which is disposed above the core 55, will cause the lure 32 to be maintained with its upper part as seen in Figures 5 and 6 normally in an uppermost position but tilted downwardly and forwardly toward its head 35, due to the fact that the mercury or shiftable weight 57 is disposed forwardly of a point located intermediate of the ends of the lure 32. The unoccupied portions of the chambers 36 and 56 are sufficient to overcome the weight of the mercury 57 and the solid portion of the lure 32, to render said lure buoyant so that it will normally float. However, as previously stated, the mercury will cause the lure to assume a downwardly and forwardly inclined position in the water making the mercury or shiftable weight crowd into the forward end of the chamber 56. Consequently, as the lure 32 is retrieved or slowly trolled at an irregular speed from left to right of Figure 5, the lure 32, when pulled to the right, will be caused to assume substantially a horizontal position by an upward movement of the head 35 and when the pull thereon is diminished, the head will again tend to sink relative to the tail portion 37, so that the movement of the lure 32 in the water will be similar to the movement of the lure 8. However, whereas the lure 8 is a subsurface lure, the lure 32 is a buoyant or surface lure.

Various modifications and changes are contemplated and may obviously be resorted to, without departing from the spirit or scope of the invention as hereinafter defined by the appended claims.

I claim as my invention:

1. A fishing lure having a hollow transparent forward end and a solid rear end, said hollow forward end being of greater length than the solid rear end and having an interior of cylindrical cross section except at its ends, and a mass of mercury positioned within the hollow portion whereby when the lure is in movement the mercury assumes a worm-like appearance as it moves from end-to-end of the hollow chamber, said cylindrical interior surface having the effect of causing the mercury to have a generally cylindrical appearance, said hollow portion including an annular forward end in which a portion of the mercury is accommodated when the mercury is crowded into the forward end of the hollow portion.

2. A fishing lure having a hollow forward end and a solid rear end, said hollow forward end being of greater length than the solid rear end, said lure including a projection extending rearwardly from the forward end of said hollow portion and having an annular recess located at the forward end of the hollow portion, and a mass of mercury loosely contained within said hollow portion for movement therein longitudinally of the lure, a portion of the mercury filling said annular recess when the mercury is crowded into the forward end of the hollow portion, said lure being formed of a material having a specific gravity substantially less than the specific gravity of the mercury, the volume of the mercury being substantially less than the volume of said hollow portion and such that the lure can be trolled in substantially a horizontal plane when a pull is exerted on the forward end thereof but will have a tendency to dive while being trolled, and said mercury causing the lure to nose dive when not being propelled through the water.

3. A fishing lure as in claim 3, and a leader attaching eye disposed beyond the forward end of the lure and having a shank embedded and anchored in said projection.

References Cited in the file of this patent

UNITED STATES PATENTS

| | | |
|---|---|---|
| 841,429 | Passage | Jan. 15, 1907 |
| 1,272,003 | Cameron | July 9, 1918 |
| 1,313,567 | Ulrich | Aug. 19, 1919 |
| 1,892,892 | Jamar | Jan. 3, 1933 |
| 2,270,487 | Withey | Jan. 20, 1942 |
| 2,598,360 | Commins | May 27, 1952 |
| 2,613,471 | Traycik | Oct. 14, 1952 |
| 2,641,862 | Poe | June 16, 1953 |
| 2,659,176 | Wenger | Nov. 17, 1953 |